Patented Aug. 2, 1932

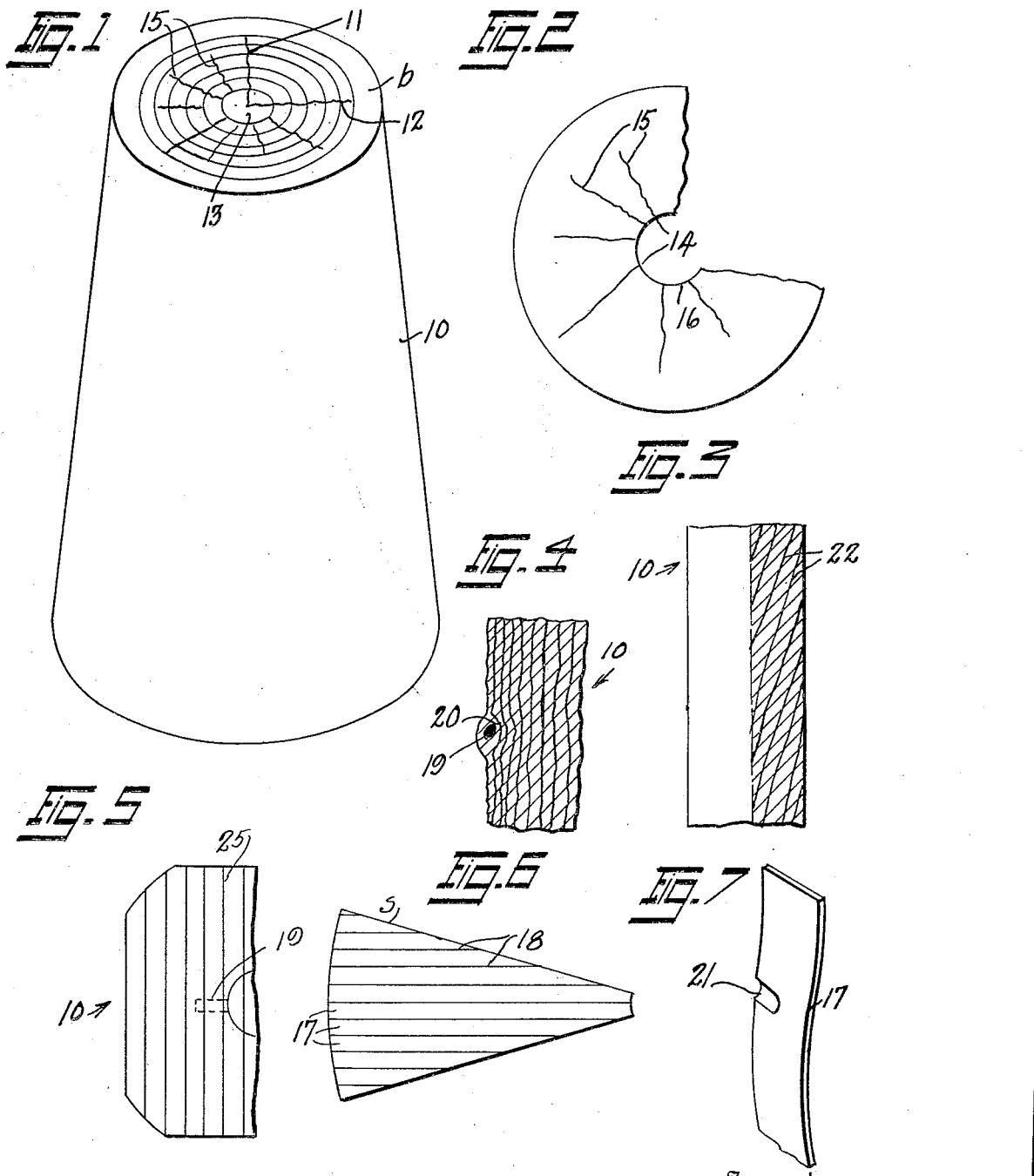

1,870,190

UNITED STATES PATENT OFFICE

MAURICE M. BERNFELD, OF ST. PAUL, MINNESOTA, ASSIGNOR, BY MESNE ASSIGNMENTS, TO HIMSELF, AND CLARENCE C. MASKOWITZ, OF NEW YORK, N. Y.

METHOD OF SPLITTING WOOD

Application filed March 6, 1930, Serial No. 433,552. Renewed January 4, 1932.

This invention relates to the method of producing boards preferably made of spruce or cedar logs, by means of first splitting the said logs along the medullary or heart rays, and further splitting them along the air cracks in the logs, instead of sawing as was done heretofore.

One of the main objects of the invention is to produce such boards in which all natural defects will be eliminated, and the natural strength of the wood will be maintained and not impaired.

Another object of the invention is to produce spruce, cedar or like boards, split from the trunk of a tree parallel to the natural growth of the vertical fibres of the said tree.

Other objects and novel features of my invention will become more apparent as the specification proceeds.

In the drawing forming a part of this specification.

Figure 1 is a perspective view of a trunk of a tree showing the heart rays, pith and air cracks existent therein.

Figure 2 is a top end view of a tree trunk after the section thereof between the heart rays, as well as the pith or core has been removed.

Figure 3 is a fragmental side view of a tree trunk partly in section showing a twisting of the vertical fibres of the wood.

Figure 4 is a longitudinal sectional view of a fragment of a tree trunk in which a knot exists.

Figure 5 is a fragmental end view of a log showing the air cracks running through the trunk and consequently through the board when sawed by the present day method.

Figure 6 is a similar view to Figure 5 showing lines along which the trunk may be split into boards to eliminate these defects and Figure 7 is a perspective view of a board split from the tree and before it is dried.

By looking at an end view or cross section of a trunk of a tree, it will be seen that the trunk consists of a series of rings, these rings are formed by the growth of the cambium, and each ring denotes a year's growth. While the tree is still young these rings or layers are substantially circular and the longitudinal fibres are substantially vertical, but as they become taller the wind tends to twist these rings or layers so that these fibres of the outer of such layers or rings become twisted. Likewise as the tree grows the lower branches which spring from the heart of the tree die and are covered up by the annual rings. Since the wood of the limbs is harder than the fibres, these fibres grow about the harder limb in substantial semi-circles.

By carefully observing the end of the trunk of a tree, a pair of heart or medullary rays can be discerned. These rays start at the center of the pith or heart and run to the bark, and extend the entire length of the tree. There are also air cracks in the tree, but these do not cross or extend to the center of the pith, but stop at the circumference thereof and may or may not reach the bark.

In carrying out my invention I utilize these heart rays and air cracks as will hereinafter be more fully described.

Referring now to the drawing in detail 10 indicates a trunk of a tree, the top of which has been removed, so that the medullary or heart rays 11 and 12 may be visible. Where these rays would terminate if they extended to the exterior of the bark $b$, and starting at the top of the tree trunk, I insert an ax or other suitable tool and commence to split the tree, which will part longitudinally only along these rays, for the reason that the said rays extend, as perviously stated from the bark to the center of the pith, and the air cracks extend only to the circumference of the pith.

After removing the zone or segment of the tree, defined by these rays, I remove the heart or pith 13. This operation is very essential as it not only discloses the ends 14 of air cracks 15, along which the trunk is to be further split, but it also enables this splitting to be performed. It will be readily understood that if the pith were not removed it would offer a tremendous resistance to any splitting action, in fact it would be almost impossible to split the remainder of the tree as the air cracks do not run to the center of the pith as do the rays 11 and 12.

The cracks 15 extend outwardly from the circumference 16 of the pith towards the exterior at about the same angle as the heart rays, but seldom reach the outer circumference of the tree. Thus even if these cracks are not entirely visible across the end of the trunk, yet if an ax or other splitting instrument is brought down at or near the point where the cracks 15 would terminate at the circumference of the tree top, the tree will split and separate along the said cracks throughout the entire length of the tree. This operation is continued until the entire trunk has been split into segments.

After the tree has been split into segments, each segment may be further split into boards 17. This is accomplished by scribing lines 18 one at a time and splitting the segments along the said lines after each line has been scribed. In this manner the boards will have no cracks or other defects since in splitting the parting of the wood will follow the natural grain or fibre of the tree as grown. Likewise if a knot 19 left by a dead limb is encountered the board will part along a semicircular line 20 and then straight again to the end of the log. Any defect left by the knot as for instance a curvature 21 may be later cut out; that is the board 17 may be cut into shorter lengths and the portion 21 may be discarded.

In Figure 3 I have shown the fibres of the tree trunk partly twisted, as at 22; this is a common occurence and the twist is often very pronounced spiralling completely around the tree in a comparatively short distance and when the boards are formed they will consequently assume this twisted shape, but this twist will entirely disappear after the boards are properly dried.

For this purpose I construct a shed having removable doors or sides and a floor raised considerably above the ground where the boards are left to dry slowly. This shed is left closed on three sides that it is only open on the side opposite the direction from which the wind blows, so that the wind will not affect the boards any. I find that by this method the boards when dry become perfectly straight.

In Figure 5 I have shown a fragmental end view of a log having vertical lines 25 thereon to indicate boards as at the present day sawed from the log. It will be noted that in this method of producing boards, all the natural defects of the tree remain in the boards and due to the twisting of the vertical fibres of tree these fibres are cut into and the natural strength of the wood is impaired. Likewise after these boards are subjected to weather conditions they will commence to check and split wherever the air cracks are present.

In many instances these defects are irreparable, especially so when these boards go into the manufacture of aeroplanes in which cases, after a short while, these planes become useless, because if these planes were to be used after checking commences they may break while in the air thus causing serious damage and loss of life.

With my improved method of producing boards for such purposes this is impossible as all the natural defects of the tree are eliminated and the boards are split parallel to the natural growth of the tree thus retaining the full strength of the wood.

From the foregoing it will be seen that I have provided means for producing boards that are substantially perfect in all respects and adapted to be used in aeroplanes, and in all other cases where the use of perfect lumber is essential.

While I have described in detail a particular method for producing boards, I do not restrict myself to this particular method, as variations may be had that will come within the scope of the appended claims.

Having described my invention what I claim as new and desire to secure by Letters Patent is:

1. A step in the method of producing boards from logs having rays emanating from the hearts of the said logs, which consists in removing the heart of the log, after a section of the log defined by its heart rays has been removed.

2. The method of producing boards from trees having rays emanating from the hearts of the said trees, which consists in removing the top thereof after the tree has been felled, then splitting the tree downwardly from the said top along the heart rays thereof, then removing the pith, then splitting the tree from the top thereof into sections along its air cracks, and finally splitting each section into boards.

In testimony whereof I hereunto affix my signature.

MAURICE M. BERNFELD.